Jan. 31, 1967  HISANORI ATAKA  3,301,153
PHOTOGRAPHIC CAMERAS HAVING AN APERTURE DEVICE
COUPLED WITH AN EXPOSURE METER
Filed Dec. 2, 1963

3,301,153
PHOTOGRAPHIC CAMERAS HAVING AN APERTURE DEVICE COUPLED WITH AN EXPOSURE METER
Hisanori Ataka, Tokyo, Japan, assignor to Kabushiki Kaisha Ricoh, Tokyo, Japan, a corporation of Japan
Filed Dec. 2, 1963, Ser. No. 327,371
Claims priority, application Japan, Nov. 30, 1962, 37/54,043
4 Claims. (Cl. 95—10)

This invention relates to photographic cameras having an aperture device coupled with an exposure meter and particularly to mechanisms used in such cameras to enable the aperture device to be manually operated to give any desired aperture setting by releasing the coupling of the device with the exposure meter.

Photographic cameras with which the present invention is concerned have a shutter mechanism which is principally of the simplified construction giving a single exposure time setting. However, they may include a shutter device having different operation times to give a plurality of exposure time settings for counter-light, color or other photographic procedures.

Figure 1:
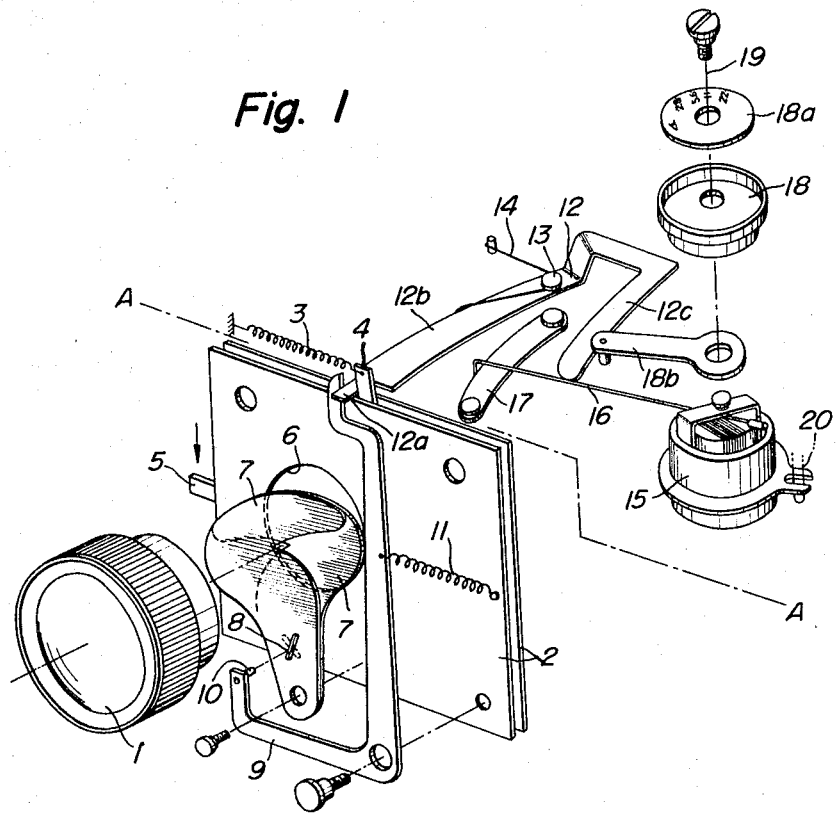
Figure 2:
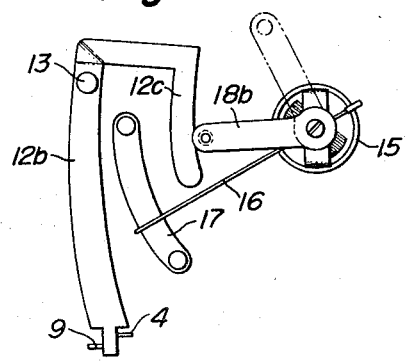

The present invention will now be described in detail with reference to the accompanying drawing, which illustrates one embodiment of the invention and in which:

FIG. 1 is an exploded perspective view of a camera constructed according to the present invention illustrating the aperture mechanism coupled with the exposure meter with the camera body itself removed for the sake of simplicity; and FIG. 2 is a plan view of a part of the mechanism shown in FIG. 1.

In FIG. 1, parts shown below the dotted lines A—A are those mounted on the front face of the camera and those shown above the dotted lines A—A are parts mounted on the top of the cameras body. Mounted on the front face of the camera is a lens 1 and a pair of shutter mounting plates 2 are fixed rearwardly of the lens 1 with an appropriate space provided between the plates to accommodate a shutter of the guillotine, vario or other desired type. A movable lever 4 is normally urged by a tension spring 3 to the left as viewed in FIG. 1 and, upon depression of the release lever 5, when it actuates movable lever 4 to the right by a distance against the action of said spring, the shutter is operated to open and close to make an exposure, that is, to allow a light flux passing through the lens 1 to proceed through aligned openings 6 formed in said mounting plates 2 to reach the photosensitive material loaded in the camera body. A pair of diaphragm blades 7 pivoted to a stationary member of the camera have recesses formed in the adjacent opposite side edges of the blades to define a diaphragm aperture in alignment with the optical axis of the lens 1. The overlapping portions of the diaphragm blades are formed with oppositely inclined elongated slots crossing each other to define a through opening 8. A bellcrank lever 9 is pivoted to an appropriate fixed part of the camera and one arm of the lever carries a pin 10 at the free end thereof, which is fitted in said through opening 8. The bellcrank lever 9 is normally biased by an appropriate spring 11 to rotate about the pivotal connection in a clockwise direction as viewed in FIG. 1. A separate lever 12 is pivoted intermediate its ends to the camera body as at 13 and one arm of lever 12 is engaged at its end 12a by the extremity of the other arm of bellcrank lever 9 so as to be in pressure contact with movable lever 4 of the shutter. It is to be understood that the spring 3 has a spring rate higher than the spring 11 so that the biasing torque on the lever 9 is not sufficient to move the movable lever 4 to the right through the medium of the arm end 12a of the lever 12.

The lever 12 pivotally mounted on top of the camera body, which is covered by a decorative covering arranged on the top portion of the camera, is biased to rotate about the pivot stud 13 in a counterclockwise direction as viewed in FIG. 1 by a light spring 14. It is also to be understood that the spring bias is not sufficient to move the movable lever 4 of the shutter to the right against the bias of spring 3. The other arm 12c of the lever 12 has an upwardly offset portion extending substantially parallel to the first arm 12b and thus the lever 12 has a generally U-shaped configuration having arms of different lengths.

On one side of the lever 12, an exposure galvanometer 15 is mounted on the camera body, and its movable pointer 16 has a downturned free end arranged to freely swing along the outer edge of an arcuate pointer support plate 17, which is fixed to the top surface of the camera body. The outer edge of the pointer support plate 17 is evidently curved to have a center on the axis of rotation of the pointer 16. The pointer support is arranged so that its outer edge is disposed between the galvanometer 15 and the longer arm 12b of said U-shaped lever 12 which has its free end in pressure contact with the movable lever 4 of the shutter, as shown clearly in FIG. 2.

An adjusting knob 18 for adjusting the diaphragm aperture is mounted immediately above the shaft of the pointer of galvanometer 15 in alignment therewith for rotation relative to the camera body and galvanometer. A disc 18a is fixed to the top of knob 18 coaxially therewith and carries along the periphery a scale including aperture values for manual selection and a marking such as "A" which indicates the coupled state of the aperture device with the exposure meter. An arm 18b integral with said adjusting knob radially extends therefrom and carries at its free end a pin arranged so as to be positioned between the outer side edge of the shorter arm 12c of the U-shaped lever 12 and the galvanometer 15 of the exposure meter. The scale on the knob 18 is readable by the aid of an index 19 carried, for example, on the top decorative covering of the camera.

The device operates as follows: Firstly, when the knob 18 is turned to bring the marking A on the scale plate into registry with the stationary index 19, the arm 18b integral with the knob is moved to a position indicated by dotted lines in FIG. 2. Under this condition, when the camera is aimed at the scene to be photographed and the shutter button is depressed, the shutter release lever 5 is lowered to move the movable lever 4 to the right as viewed in FIG. 1 against the spring bias. At the same time, the U-shaped lever 12 on the camera body is turned counter-clockwise or in the direction in which the lever is spring-biased until the downturned free end of the galvanometer pointer 16 is pressed against the pointer support 17 by the adjacent side edge of the longer arm 12b of the lever. The amount of rotation of the lever during this time depends upon the pointer position or the amount of deflection thereof. It will be noted, therefore, that the amount of rotation of the bellcrank lever 9 following the movement of the lever 12 under the bias of spring 11 as well as the area of the diaphragm aperture defined by the diaphragm baldes 7 and variable with rotation of the lever 9 now has an appropriate value corresponding to the brightness of the scene to be photographed. Subsequently, the movable lever 4 of the shutter is further moved to reach a predetermined position when the shutter blades are operated to effect a proper exposure.

Secondly, when the knob 18 is turned to place any desired aperture value on the scale plate 18a into registry with the index 19, the arm 18b is shifted to a position indicated by solid lines in FIG. 2. With the arm 18b in this position, the pin carried by the arm at its free end is located at a point slightly spaced from the outer side edge of the shorter arm 12c of the U-shaped lever toward the galvanometer. The spacing between the pin and the adjacent arm edge depends upon the set position of the arm 18b. In this arrangement, depression of the shutter release lever 5 causes the movable lever 4 to move to the right as viewed in FIG. 1 while allowing the U-shaped lever 12 to turn counterclockwise about the pivot stud 13 and the bias of spring 14. The counterclockwise rotation of the U-shaped lever 12 is restrained when the outer side edge of the shorter lever arm 12c abuts against the pin carried by the arm 18b at its free end before the longer arm 12b of the U-shaped lever comes into contact with the pointer 16 of the galvanometer. It will be recognized, therefore, that the diaphragm aperture, being controlled by the bellcrank lever 9 following the U-shaped lever 12, now has an area corresponding to the aperture scale setting on the knob 18. The movable lever 4 continues to move to the right to reach a predetermined position to operate the shutter blades for exposure in the same manner as when the knob is set for automatic aperture control.

In the introductory part of the specification it has been pointed out that the shutter usable with the present invention may have a plurality of exposure time settings to adapt the camera for the counter-light picture-taking or for the compensation of sensitivity of the light-sensitive material. Such compensation can also be attained by rotating the galvanometer itself instead of providing more than one exposure time settings, as will readily be understood. To this end, a bifulcation may be made integrally on the periphery of the galvanometer to receive a rod 20 which is exteriorly operable to rotate the galvanometer by any desired amount.

Switching mechanism for converting the aperture device from automatic operation coupled with the exposure meter to manual operation or vice versa has previously been proposed in many forms, but none of them has proven entirely satisfactory for various design reasons. According to the present invention, it will be appreciated that a mechanism effective for the purpose is provided which is relatively simplified and easy to manufacture and permits the galvanometer to be arranged extremely close to the shutter, enabling substantial reduction in size of the entire camera structure when applied to miniature cameras and particularly to those having a shutter mechanism of relatively simple construction.

What is claimed is:

1. A photographic camera having an aperture device coupled with an exposure meter, and means for controlling the lens aperture and operable in association with a shutter release lever to hold a pointer of the exposure meter in a deflected position, said camera comprising a pivotal member for holding the pointer of the exposure meter in its deflected position, a member disposed adjacent to said pivotal member and displaceable by external operation, said displaceable member being coaxially mounted with respect to the pointer for movement about a common axis, and means for bringing said displaceable member into the path of pivotal movement of said pivotal member so that the pivotal movement of said pivotal member is restrained before said pivotal member comes into engagement with the pointer of the exposure meter to hold the latter in its deflected position, whereby the lens aperture is manually controllable, said pivotal member being a lever of U-shape which is urged in a particular angular direction, said lever including a pair of arms one of which is adapted for being held in position when the shutter release lever is disengaged and is free when the latter lever is engaged, whereas the other arm cooperates with said displaceable member and the pointer.

2. A camera as claimed in claim 1 wherein said displaceable member is movable along a surface of said other arm to pivotally move the U-shaped lever and thereby set the len's aperture before said other arm reaches the pointer whereby a manual operation can be effected.

3. A camera as claimed in claim 2 comprising an arcuate pointer support disposed between the arms of the U-shaped lever, said pointer having a downturned end which travels along the pointer support.

4. A camera as claimed in claim 3 wherein said means for moving the displaceable member comprises an adjusting knob coaxially mounted with respect to the pointer and the displaceable member for moving the displaceable member into the path of said other arm to manually set the len's aperture or to move the displaceable member to a position remote from said other arm whereby the pivotal member will undergo pivotal movement over a distance determined by the position of the pointer.

References Cited by the Examiner

UNITED STATES PATENTS

| | | | |
|---|---|---|---|
| 3,016,811 | 1/1962 | Bundschuh et al. | 95—10 |
| 3,077,822 | 2/1963 | Morelle | 95—10 |
| 3,106,882 | 10/1963 | Maitani | 95—10 |

FOREIGN PATENTS 1,119,660  12/1961  Germany.

NORTON ANSHER, *Primary Examiner.*

J. F. PETERS, *Assistant Examiner.*